US005578815A

United States Patent [19]

Nakase et al.

[11] Patent Number: 5,578,815

[45] Date of Patent: Nov. 26, 1996

[54] BIAS CIRCUIT FOR MAINTAINING A CONSTANT POTENTIAL DIFFERENCE BETWEEN RESPECTIVE TERMINALS OF MORE THAN ONE AVALANCHE PHOTODIODE

[75] Inventors: Shigeki Nakase; Shigeyuki Nakamura; Tsuyoshi Ohta, all of Hamamatsu, Japan

[73] Assignee: Hamamatsu Photonics K.K., Hamamatsu, Japan

[21] Appl. No.: 272,071

[22] Filed: Jul. 8, 1994

[30] Foreign Application Priority Data

Jul. 9, 1993 [JP] Japan .................................... 5-170289

[51] Int. Cl.$^{6}$ ........................................................ G01J 1/42

[52] U.S. Cl. ................................ 250/214 R; 250/214 C; 327/514; 327/538

[58] Field of Search ............................... 250/214 C, 238, 250/214 R; 327/513, 514, 538

[56] References Cited

U.S. PATENT DOCUMENTS 4,181,863 1/1980 Parker ..................................... 327/513
4,236,069 11/1980 Laughlin ............................. 250/214 R
4,292,514 9/1981 Ohtomo .............................. 250/214 C
4,599,527 7/1986 Beaudet et al. ......................... 327/513
4,945,227 7/1990 Jones et al. .......................... 250/214 R
5,194,727 3/1993 Johnson et al. ...................... 250/214 R

FOREIGN PATENT DOCUMENTS 60-111540 6/1985 Japan .
60-180347 9/1985 Japan .
244218 2/1990 Japan .

*Primary Examiner*—Edward P. Westin
*Assistant Examiner*—John R. Lee
*Attorney, Agent, or Firm*—Cushman Darby & Cushman, L.L.P.

[57] ABSTRACT

A bias circuit for applying a bias voltage to an avalanche photodiode APD2 for detecting light comprises a first diode APD1, a power supply $V_H$ connected to the first diode APD1, for applying a voltage to make the diode in breakdown between an anode and a cathode of the first diode APD1, and a constant voltage circuit V2 connected to the avalanche photodiode APD2 for detecting light, for applying a voltage difference of a breakdown voltage generated between the anode and the cathode of the first diode APD1 minus a constant voltage to the avalanche photodiode. The constant voltage is substantially independent from current flowing in the avalanche photodiode APD2 for detecting light to the avalanche photodiode.

12 Claims, 8 Drawing Sheets

BIAS CIRCUIT FOR MAINTAINING A CONSTANT POTENTIAL DIFFERENCE BETWEEN RESPECTIVE TERMINALS OF MORE THAN ONE AVALANCHE PHOTODIODE

BACKGROUND OF THE INVENTION

1. Field of the Invention

The present invention relates to a bias circuit for driving an avalanche photodiode with high multiplication factor.

2. Related Background Art

An avalanche photodiode (APD) is a semiconductor photodetector which has high photodetection sensitivity and high speed of response utilizing the avalanche multiplication. The APD is used to perform the photodetection with high sensitivity. However, each APD has an operating characteristic which varies according to temperature during operation. As a temperature compensating circuit for the APD, circuits disclosed in "Japanese Patent Laid-open No. Shou 60-111540 (111540/1985)", "Japanese Patent Laid-open No. Shou 60-180347 (180347/1985)", and "Japanese Patent Laid-open No. Hei 2-44218 (44218/1990)" have been known.

SUMMARY OF THE INVENTION

The inventors of the present application found the fact that the difference between the voltage at which the APD showed a constant multiplication factor and the breakdown voltage was substantially constant. The present invention was developed based on this discovery. In the case of using a circuit of the present invention, the photodetection can be performed with higher stability to temperature as compared with a conventional circuit which is disclosed in "Japanese Patent Laid-open No. Hei 2-44218 (44218/1990)" (see FIG. 5–FIG. 8).

The present invention relates to a bias circuit for applying a bias voltage to an avalanche photodiode for detecting light. This bias circuit comprises a first diode, a power supply connected to the first diode, for applying a voltage between an anode and a cathode of the first diode to make the first diode in breakdown, and a constant voltage circuit connected to the avalanche photodiode for detecting light, for applying a voltage difference of a breakdown voltage generated between the anode and the cathode of the first diode minus a constant voltage to the avalanche photodiode. The constant voltage is substantially independent from current flowing in the avalanche photodiode for detecting light.

In a view of temperature compensation (compensation for the temperature dependence of the APD gain versus voltage relationship), the first diode is preferably an avalanche photodiode, and the first diode preferably has the similar structure as the avalanche photodiode for detecting light. The similar structure means that the breakdown voltage of one avalanche photodiode is within a range of 100±20% of the breakdown voltage of the other avalanche photodiode. This constant voltage circuit can be achieved using, e.g., a Zener diode. A cathode of the Zener diode is connected to a cathode of the first diode, and an anode of the Zener diode is connected to the cathode of the avalanche photodiode for detecting light.

The Zener diode operates in the breakdown region by applying a reverse bias voltage. The voltage generated at both ends of the ideal Zener diode does not depend on current flowing in the avalanche photodiode for detecting light. In other words, the constant voltage circuit generates a voltage substantially independent from current flowing in the avalanche photodiode for detecting light. In a case that the current flowing in the avalanche photodiode for detecting light varies ±50% and the voltage generated by the constant voltage circuit varies in a range of ±20%, the constant voltage circuit generates a voltage "substantially" independent from the current flowing in the avalanche photodiode for detecting light.

Further, a bias circuit of the present invention comprises a first diode, a power supply for applying a reverse voltage to make the diode in breakdown between an anode and a cathode of the first diode, and a constant voltage circuit connected between an anode of the avalanche photodiode for detecting light and ground, for generating a constant voltage substantially independent from current flowing in the avalanche photodiode for detecting light.

In a view of temperature compensation, the first diode is preferably an avalanche photodiode and has the similar structure as the avalanche photodiode for detecting light.

The constant voltage circuit may comprises a Zener diode, and a cathode of the Zener diode may be connected to the cathode of the first diode, and an anode of the Zener diode may be connected to the cathode of the avalanche photodiode for detecting light.

Further, the constant voltage circuit comprises an operational amplifier the output of which is connected to an anode of the avalanche photodiode for detecting light, a first resistor connected between a non-inverting input of the operational amplifier and the output of the operational amplifier, a second resistor connected between a non-inverting input of the operational amplifier and ground, a condenser connected between the inverting input of the operational amplifier and the output of the operational amplifier, and a third resistor connected between the inverting input of the operational amplifier and ground.

The constant voltage circuit further comprises a transistor connected between the output of the operational amplifier and the anode of the photodiode for detecting light, and a base of the transistor is connected to the output of the operational amplifier, an emitter to ground, and a collector to the anode of the photodiode for detecting light. The constant voltage circuit may further comprise a variable transistor connected between the third resistor and ground. One end of the variable resistor is kept at a predetermined potential.

The present invention also relates to a photodetection circuit for outputting a signal corresponding to incident light. A photodetection circuit comprises a first diode, a power supply connected to the first diode, for applying a reverse voltage between an anode and a cathode of the first diode to make the diode in breakdown, a plurality of avalanche photodiodes for detecting light connected to a cathode of the first diode, and a constant voltage circuit for generating a constant voltage substantially independent from current flowing in the avalanche photodiode for detecting light, connected between the cathode of the first diode and a cathode of the avalanche photodiode for detecting light, or between an anode of the avalanche photodiode for detecting light and ground.

In a view of temperature compensation, the first diode is preferably an avalanche photodiode and has the similar structure as the avalanche photodiode for detecting light. The constant voltage circuit may comprise a Zener diode the cathode of which is connected to the first diode and the anode of which is connected to the cathode of the avalanche photodiode for detecting light.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS

Figure 1:
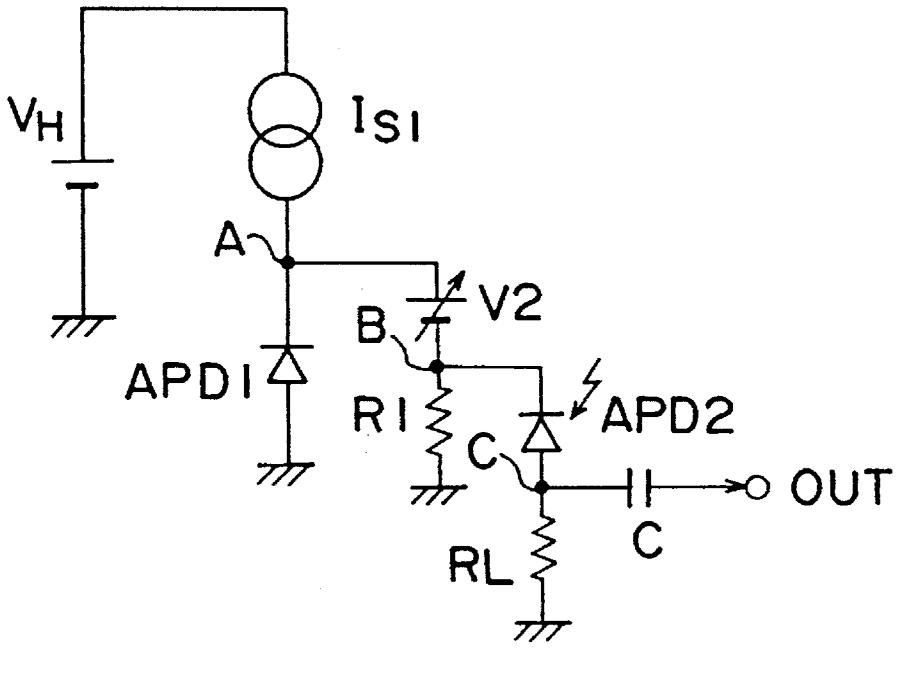
FIG. 1 is a circuit diagram of basic structure of the present invention.

The embodiments of the present invention will be explained with reference to the drawings. The inventors of the present application have developed the photodetection circuits for detecting optical signals which are stable against the change of temperature using a first APD for sensing temperature and a second APD for detecting an optical signal the characteristics of which are substantially the same as that of the first APD. When two avalanche photodiodes which have the similar structure are made of the same material, their characteristics are theoretically matched but practically not. Note that the similar structure means that the breakdown voltage of one avalanche photodiode is within 100±20% of the breakdown voltage of the other avalanche photodiode.

The inventors of the present application experimented many times and found that when the voltage difference ($Vi_2=Vb_1-V2$) of the breakdown voltage ($Vb_1$) of the first APD minus the substantially constant voltage (V2) was applied to the second APD circuit, the temperature characteristic of the multiplication factor (M) of the second APD was drastically improved. In other words, in the circuit according to the present invention, the first APD and the second APD satisfy a relation of $Vb_1-Vi_2$=constant value (V2). The second APD circuit comprises the second APD. Note that in a case of the magnification factors of the first APD and the second APD exceeding 50, the temperature characteristic of the magnification factor of the second APD is drastically improved.

A constant voltage circuit for generating a potential difference which is substantially independent from the current flowing into the second APD is connected between the second APD circuit and the first APD to subtract the substantially constant voltage (V2) from the breakdown voltage ($Vb_1$) of the first APD, and then the voltage ($Vi_2$) is applied to the second APD circuit. Further, in the bias circuit according to the present invention, the voltage by which the first diode APD1 is in breakdown may be applied to the first diode APD1, and the cathode of the first diode APD1 and the cathode of the second diode APD2 may be connected, and the constant voltage circuit may be connected between the anode of the second diode APD2 and ground. A constant voltage source using a Zener diode or an operational amplifier is one example of such a constant voltage circuit. It is well-known that "constant voltage circuit" generates a voltage which is completely not independent from a circuit connected thereto. In a case that the quantity of currents flowing into an avalanche photodiode APD2 for detecting light and the voltage generated by the constant voltage circuit varies within ±20%, the constant voltage circuit V2 generates a voltage which does "substantially" not depend on current flowing into the avalanche photodiode APD2 for detecting light.

A bias circuit for an avalanche photodiode according to the present invention was developed based on the above findings.

FIG. 1 shows a circuit diagram of a bias circuit according to one embodiment of the present invention. The bias circuit uses two APDs the characteristics of which are similar. The first APD1 is used for sensing temperature, not for causing light to be incident. The second APD2 is used for detecting an optical signal. One feature of the bias circuit is that the voltage difference $VB=Vi_2=Vb_1-V2$ of the voltage $Vb_1$ (breakdown voltage $Vb_1$) which is defined by the potential of the cathode of the first diode APD1 minus the constant voltage (V2) which is independently controllable against the current flowing in the second APD2 is applied to the cathode of the second APD2 (input of the second APD circuit).

The anode of the first APD1 is grounded. The cathode of the first APD1 is connected to a node A of FIG. 1. The anode of a power supply $V_H$ is connected to the node A through a constant current source $I_{S1}$. The cathode of the power supply $V_H$ is grounded. The current $I_s$ flows into the node A. The constant voltage circuit V2 is connected between the node A and a node B. The constant voltage circuit V2 can decrease the potential at the node B V2 (volts) lower than the potential at the node A. In other words, the potential difference between the node A and the node B is substantially constant (V2) not depending on the current flowing in the second APD2. The potential difference between the node A and the node B can be adjusted by the constant voltage circuit V2 if necessary.

A resistor R1 for dividing current is connected between the node B and ground. The cathode of the second APD2 is connected to the node B. The anode of the second APD2 is connected to the node C. A load resistor $R_L$ of the second APD2 is connected between the node C and ground. A condenser C is connected between the node C and the output OUT. The second diode APD2, the load resistor R1, and the condenser C constitute the second APD circuit. The cathode of the second APD2 is an input of the second APD circuit.

In the following explanation, it is defined that $Vm_1$, $Vm_2$, $Vi_2$, $Vb_1$, and $Vb_2$ denote a bias voltage of the first APD1, a bias voltage of the second APD2, an input voltage of the second APD circuit, a breakdown voltage of the first APD1, and a breakdown voltage of the second APD2, respectively.

The operation of the circuit shown in FIG. 1 will be explained. The constant current Is is applied from the power supply $V_H$ to the first diode APD1. The voltage ($V_H$ volts) enough to make the first diode APD1 in breakdown is applied between the anode and cathode of the first diode APD1. Accordingly, the current Is is applied to the cathode of the first diode APD1, so that the first diode APD1 is in breakdown. The breakdown voltage ($Vb_1$) generated at both ends of the first APD1 (between the anode and cathode) is defined by a potential difference between the potential $Vb_1$ at the node A and the ground potential (0V).

Since the constant voltage circuit V2 is connected between the node A and the node B, the potential VB ($Vi_2$) at the node B is decreased voltage V2 lower than the potential $Vb_1$. Consequently, the potential $VB=Vb_1-V2$ is applied to the cathode of the second diode APD2. That is, the voltage $VB=Vi_2=Vb_1-V2$ is applied to the second APD circuit.

Assuming the voltage at the load resistor $R_L$ is $V_L$, the voltage $Vm_2=Vi_2-V_L=Vb_1-(V2+V_L)$ is applied between the anode and cathode of the second diode APD2. Accordingly, the voltage difference $Vm_2$ of the breakdown voltage $Vb_1$ of the first diode APD1 minus the constant voltage V2 which does not depend on the current flowing in the second diode APD2 is applied to the second APD circuit.

The first diode APD1 and the second diode APD2 are contained in the same package. In other words, the first diode APD1 and the second diode APD2 are placed under the same circumstances, so that the diode APD1 and the diode APD2 have the same temperature.

The bias voltage $Vm_2$ is a high voltage so that the multiplication factor M of the second diode APD2 is large enough to be a multiplication factor M (50 or above). The multiplication factor M of the second diode APD2 is large enough, so that the photodetection can be performed with high sensitivity using this circuit.

As the breakdown voltage $Vb_1$ of the first diode APD1 varies, the bias voltage $Vm_2=Vb_1-(V2+V_L)$ applied to the second diode APD2 varies in accordance with the change of the voltage $Vb_1$. In other words, the bias voltage $Vi_2$ applied to the second APD circuit varies the same amount of change of the breakdown voltage $Vb_1$ of the first diode APD1. Consequently, the temperature dependence of the multiplication factor M of the second diode APD2 for detecting an optical signal is suppressed, and the temperature dependence of the output of the second APD circuit is suppressed. The photodetection which is stable against the change of temperature can be performed with use of the circuit shown in FIG. 1.

Figure 2:
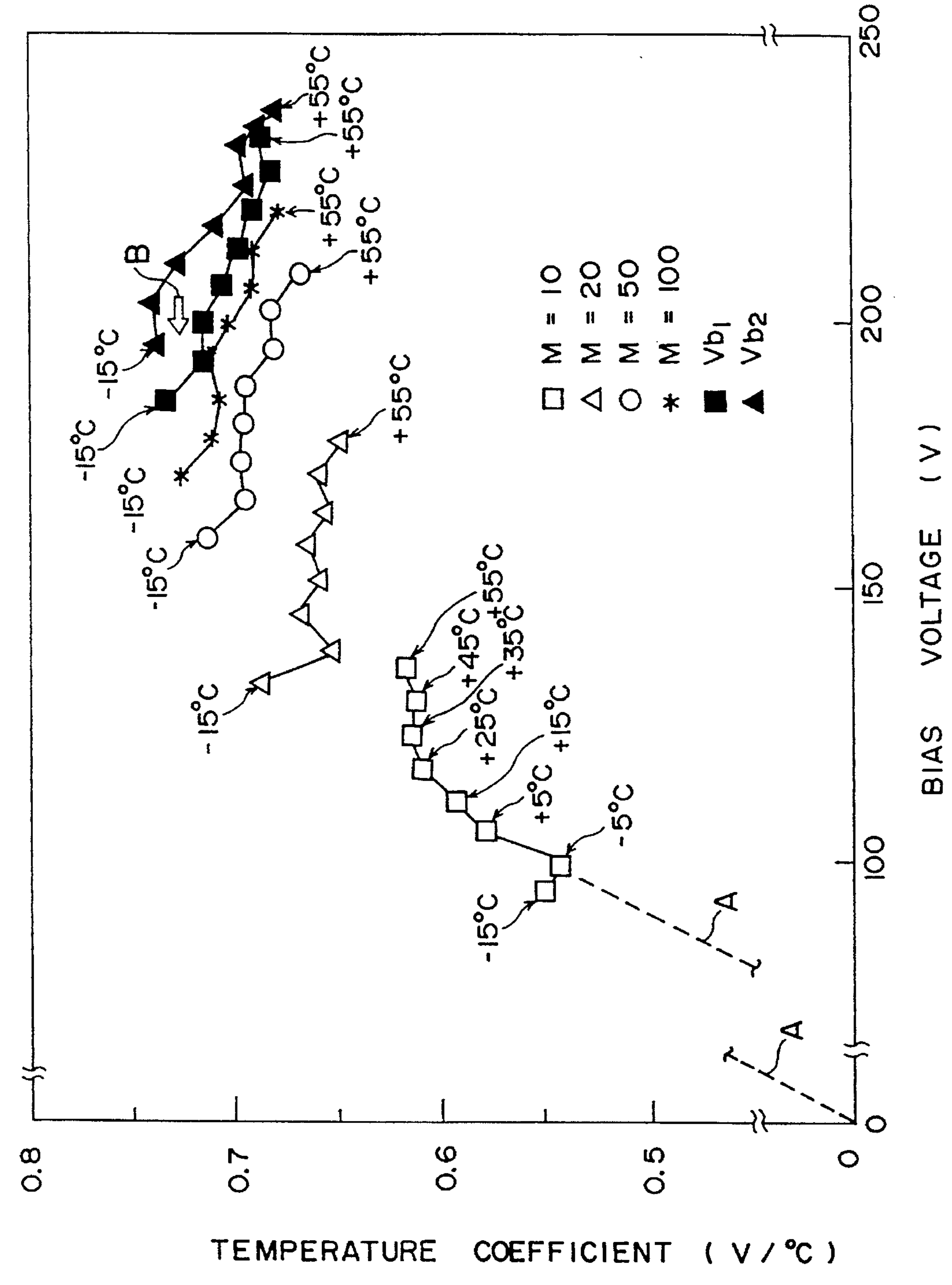
FIG. 2 is a graph showing measurement results of a breakdown voltage $Vb_1$ of APD1, a breakdown voltage $Vb_2$ of APD2, and a temperature coefficient related to a multiplication factor M of APD2 or others.

This is based on the following reasons. First, the characteristics of the avalanche photodiodes which would be used as the first diode APD1 or the second diode APD2 were evaluated. FIG. 2 is a graph showing bias voltage dependence of a temperature coefficient (V/° C.) of each avalanche photodiode, and breakdown voltage $Vb_1$ dependence of a temperature coefficient (V/° C.) of the first diode APD1 and breakdown voltage $Vb_2$ dependence of a temperature coefficient (V/° C.) of the second diode APD2 in the circuit shown in FIG. 1.

The temperature of each APD varied from −15° C. to +55° C. at a step of 10° C. (total of 7 points). The relation between the temperature coefficient (V/° C.) and the bias voltage (V) required for obtaining the desired multiplication factor M (M=10, 20, 50, 100) of the APD was examined at every temperature.

An APD which had the breakdown voltage $Vb_1$ of 215V at room temperature among APDs (type S2383) manufactured by Hamamatsu photonics k.k. was used as the first diode APD1. An APD which had the breakdown voltage $Vb_2$ of 220V at room temperature among APDs (type S2383) manufactured by Hamamatsu photonics k.k. was used as the second diode APD2. The measuring wavelength λ of light was 800 nm, and the measuring power of light was 1 nW.

The horizontal axis denotes a bias voltage (V) and the vertical axis denotes a temperature coefficient (V/° C. It is understood from FIG. 2 that the breakdown voltage $Vb_1$ of the first APD1 (shown as black squares in FIG. 2), the breakdown voltage $Vb_2$ of the second APD2 (shown as black triangles in FIG. 2), and the temperature coefficient of the multiplication M of the second APD2 (shown as white squares, white triangles, white circles, and asterisks in FIG. 2) varied as the bias voltages ($Vm_1$, $vm_2$) applied to the first APD1 and the second APD2 varied.

The evaluation of the APD characteristics shown in the graph of FIG. 2 is done by the inventors of present application for the first time.

It is considered from the graph of FIG. 2 that there is some relation between the temperature coefficient and the bias voltage. In the conventional bias circuit techniques for the avalanche photodiode, it was considered that "a ratio of the breakdown voltage and the bias voltage is constant". In other words, the temperature coefficient also varies in a proportion of the ratio of the breakdown voltage and the bias voltage. Supposing this consideration is true in a high multiplication factor (M=50 or above) region, a line connecting the plotted symbols should be approximated by a straight line A passing through the origin.

However, it is apparent from FIG. 2 that a line connecting the plotted symbols cannot be approximated by a ling passing through the origin if the breakdown voltage is divided by the resistor $R_1$ and the ratio of the breakdown voltage V and the bias voltage is constant.

In particular, in this multiplication factor region (M=50 or above), since the change of the multiplication factor M is large as compared with the change of the bias voltage, an error of the multiplication factor M becomes large and the stability of the sensitivity against temperature becomes worse.

On the other hand, in the bias circuit of the present invention, the first APD1 the characteristics of which is similar as that of the second APD2 is in breakdown, and the bias voltage of the breakdown voltage of the first APD1 minus the constant voltage is applied to the APD2, so that the stabilization of the multiplication factor M can be achieved by simple circuit.

The multiplication factor M varies according to temperature, and as apparent from the graph of FIG. 2, in the case of a large multiplication factor M (M=50 or above), lines connecting plotted symbols for each multiplication factor show the same tendency, and these lines coincide when shifted in a horizontal direction.

Consequently, the bias circuit, which compensates the change of the characteristics of the multiplication factor caused by the change of circuit temperature by making the voltage difference between the breakdown voltage of the first diode APD1 and the bias voltage applied to the second diode APD2 to be constant, can suppress the temperature dependence much lower as compared with the circuit in which the ratio of the breakdown voltage and the bias voltage is constant.

Figure 3:
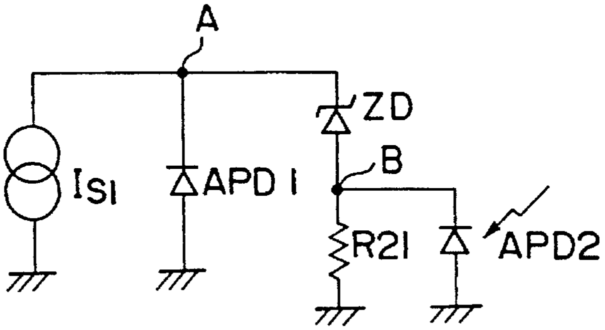
FIG. 3 is a circuit diagram showing one embodiment of a bias circuit using a Zener diode ZD.

In FIG. 3, the constant voltage circuit $V_2$ shown in FIG. 1 which gives the constant voltage difference between the breakdown voltage $Vb_1$ of the first APD1 and the bias voltage $Vm_2$ of the second APD2 is achieved with a Zener diode. The constant current source $I_S$ comprises a high voltage source (not shown) and a resistor (not shown) connected between the high voltage source and the first APD1. The constant current source $I_S$ is connected between the cathode of the first diode APD1 and ground. The anode of the first diode is grounded. The cathode of the Zener diode ZD is connected to a node A to which the constant current source $I_S$ and the cathode of the first diode APD1 are connected. The anode of the Zener diode ZD is connected to a node B. The resistor $R_{21}$ is connected between the node B and ground.

In this circuit, the first diode APD1 and the second diode APD2 are also under the same thermal condition, and the first diode APD1 is used as a temperature sensor, and the first diode APD1 is kept in a breakdown condition.

The bias voltage of the constant Zener voltage $V_Z$ minus the breakdown voltage $Vb_1$ of the first diode APD1 is applied to the APD2 to operate the second diode APD2 with the high multiplication factor M (note that $R_{21}$ is a resistor for dividing current). When the temperature varies, as the breakdown voltage of the first diode APD1 varies, the voltage applied to the second diode APD2 varies. The temperature coefficient of the bias voltage of the second diode APD2 having the constant multiplication factor is substantially the same as the temperature coefficient of the breakdown voltage of the first diode APD1. The multiplication factor of APD2 is high and kept constant.

Figure 4:
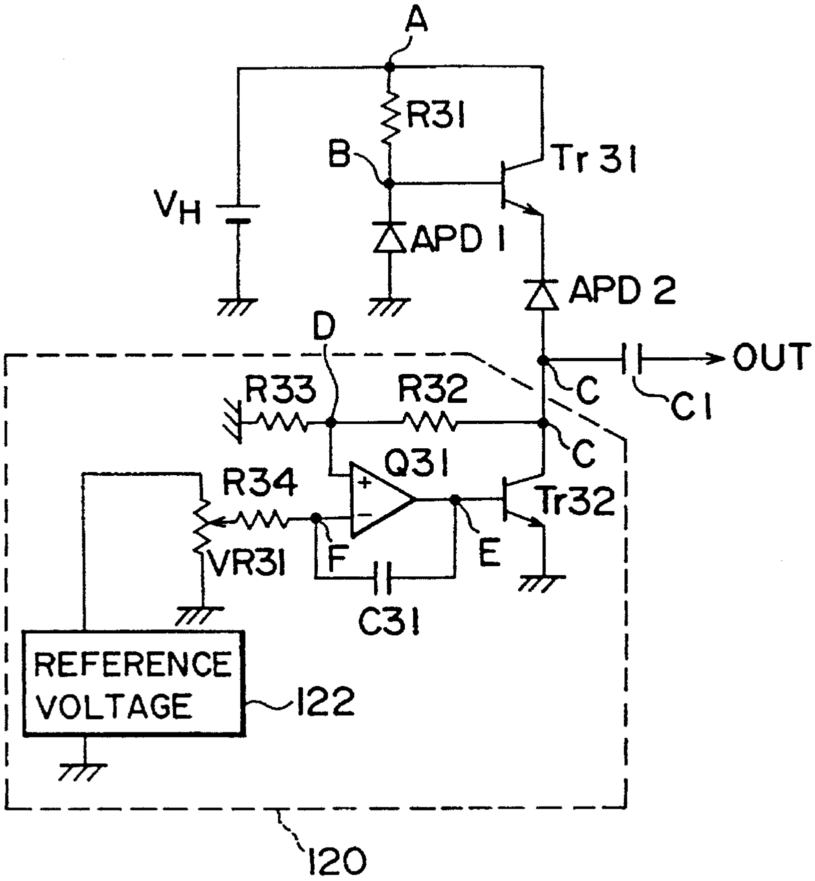
FIG. 4 is a circuit diagram showing one embodiment of a bias circuit in which a voltage difference between a breakdown voltage and a bias voltage can be adjusted.

FIG. 4 is a circuit diagram showing a circuit which is able to adjust the voltage difference between the breakdown voltage and the bias voltage. A cathode of a power supply $V_H$ is grounded. An anode of the power supply $V_H$ is connected to a node A. A resistor R31 is connected between the node A and a node B. A cathode of a first diode APD1 is connected to the node B. The anode of the first diode APD1 is grounded. A corrector of a transistor Tr31 is connected to the node A. A base of the transistor Tr31 is connected to the node B.

An emitter of the transistor Tr31 is connected to a cathode of a second diode APD2. An anode of the second diode APD2 is connected to the node C. A constant voltage circuit 120 is connected to the node C. A resistor 32 is connected between the node C and the node D. A resistor R33 is connected between the node D and ground. A corrector of a transistor Tr32 is connected to the node C. A base of the transistor Tr32 is connected to a node E. A non-inverting input of an operational amplifier Q31 is connected to the node D. A condenser C13 is connected between an inverting input of the operational amplifier Q31 and the node E.

An output of the operational amplifier Q31 is connected to the node E. The inverting input of the operational amplifier Q31 is connected to a node F. A resistor 34 is connected between the node F and a volume VR31 which is a variable resistor. One end of the variable resistor VR31 is connected to a reference voltage source 122 and the other end is grounded. A condenser C1 is connected between the node C and the output OUT.

In the same way as the circuit shown in FIG. 1, when the voltage is applied to the first diode APD1 by the power supply $V_H$, the first diode APD1 operates in the breakdown region. The voltage of the cathode of the first diode APD1 is buffered and applied to the cathode of the second diode APD2. The constant voltage circuit 120 is connected to the anode of the second diode APD2. Consequently, the voltage difference between the breakdown voltage of the first diode APD1 and the output voltage of the constant voltage circuit 120 is applied to the second diode APD2 as a bias voltage.

The constant voltage circuit 120 is a circuit in which the reference voltage from the reference voltage source 122 is divided by the volume VR31 and this divided voltage is applied to the anode of APD2 from an amplifier which comprises the operational amplifier Q31 and the transistor Tr32. The output voltage of the circuit 120 can vary by the volume VR31, and the magnification factor M of the second diode APD2 is adjusted and set by the volume VR31. In FIG. 4, the leakage current of the second diode APD2 flows into the emitter and collector of the transistor TR32. In the case of very small leakage current, the stable operation cannot be achieved. In such a case, a resistor for dividing current is connected in parallel to the second diode APD2.

The temperature dependence of the bias circuit shown in FIG. 4 was evaluated. FIGS. 5–8 are graphs showing the temperature dependence of the multiplication factor M of the second diode APD2 shown in FIG. 4. In FIGS. 5–8, the solid lines show the multiplication factor M of the APD2 for detecting light in the case of using the bias circuit of the present invention of FIG. 4, and the dotted lines show the multiplication factor M of the APD2 for photodetection in the case of using the conventional bias circuit disclosed in "Japanese Patent Laid-open No. Hei 2-44218 (44218/1990)".

The characteristics of the first diode APD1 and the second diode APD2 are similar as the characteristics of the APD shown in FIG. 2, These evaluations were conducted under the condition that the wavelength λ of light for measurement was 800 nm and that the power of light P was constant, and that the temperature was in a range of −20° C. to +60° C.

Figure 5:
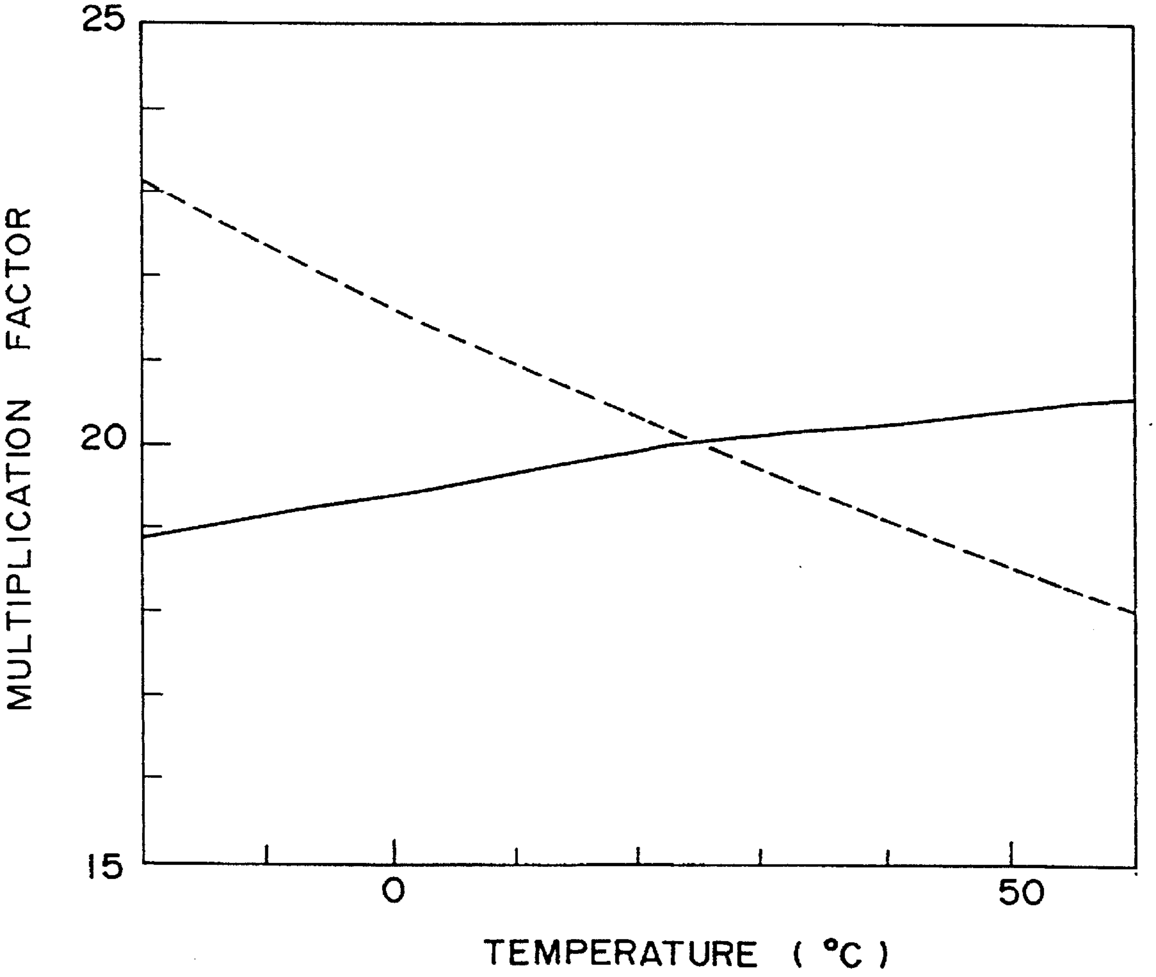
FIG. 5 is a graph showing temperature dependence of a multiplication factor M of a bias circuit of the present invention (solid line) and a conventional bias circuit (dotted line) (the multiplication factor is 20 at room temperature).

FIG. 5 is a graph showing experimental results which were conducted by adjusting the bias voltage of the APD2 for detecting a signal and setting the multiplication factor M of the second diode APD2 for detecting a signal to 20 at 25° C.

Figure 6:
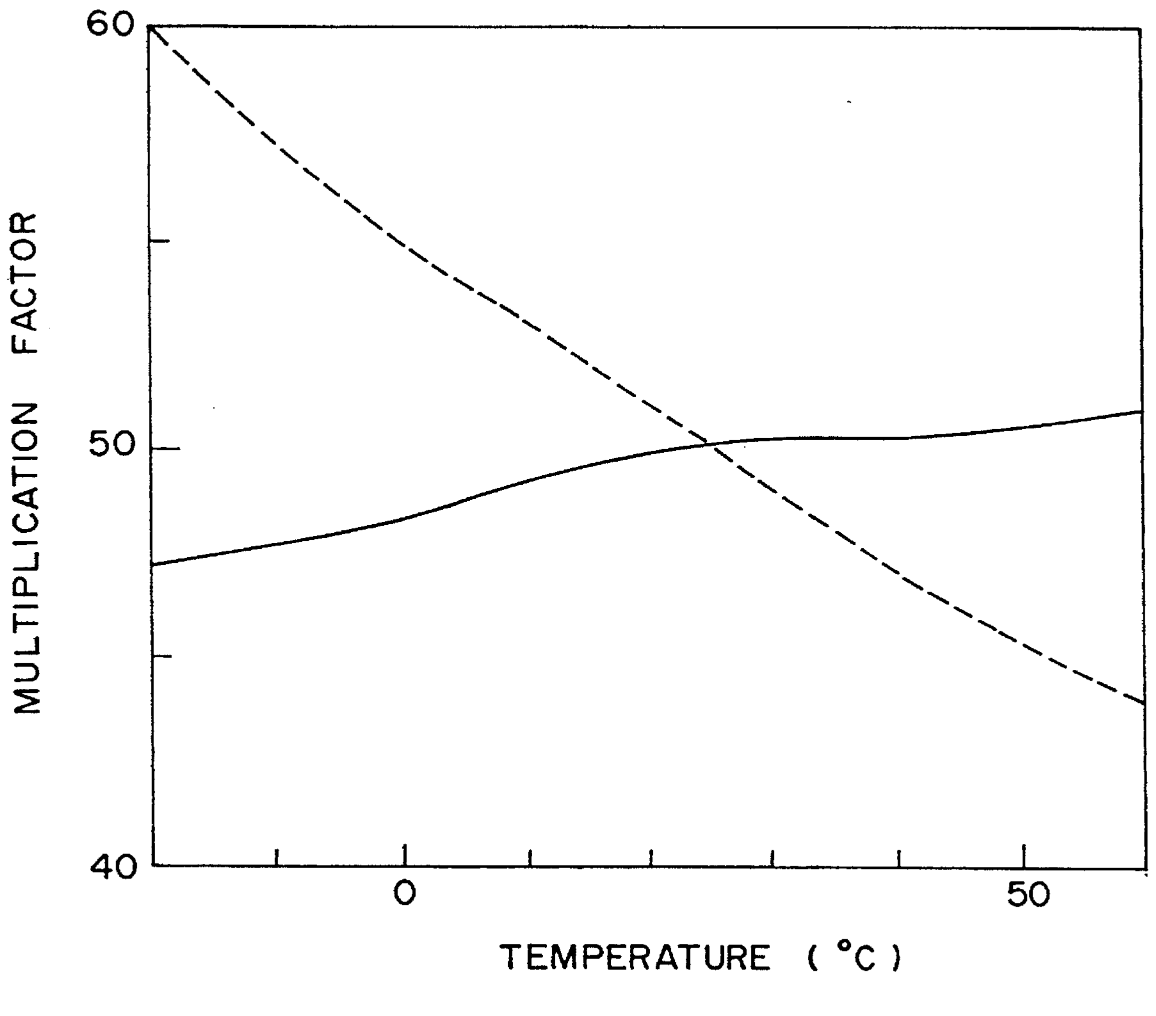
FIG. 6 is a graph showing temperature dependence of a multiplication factor M of a bias circuit of the present invention (solid line) and a conventional bias circuit (dotted line) (the multiplication factor is 50 at room temperature).

FIG. 6 is a graph showing experimental results which were conducted by adjusting the bias voltage of the APD2 for detecting a signal and setting the multiplication factor M of the second diode APD2 for detecting a signal to 50 at 25° C.

Figure 7:
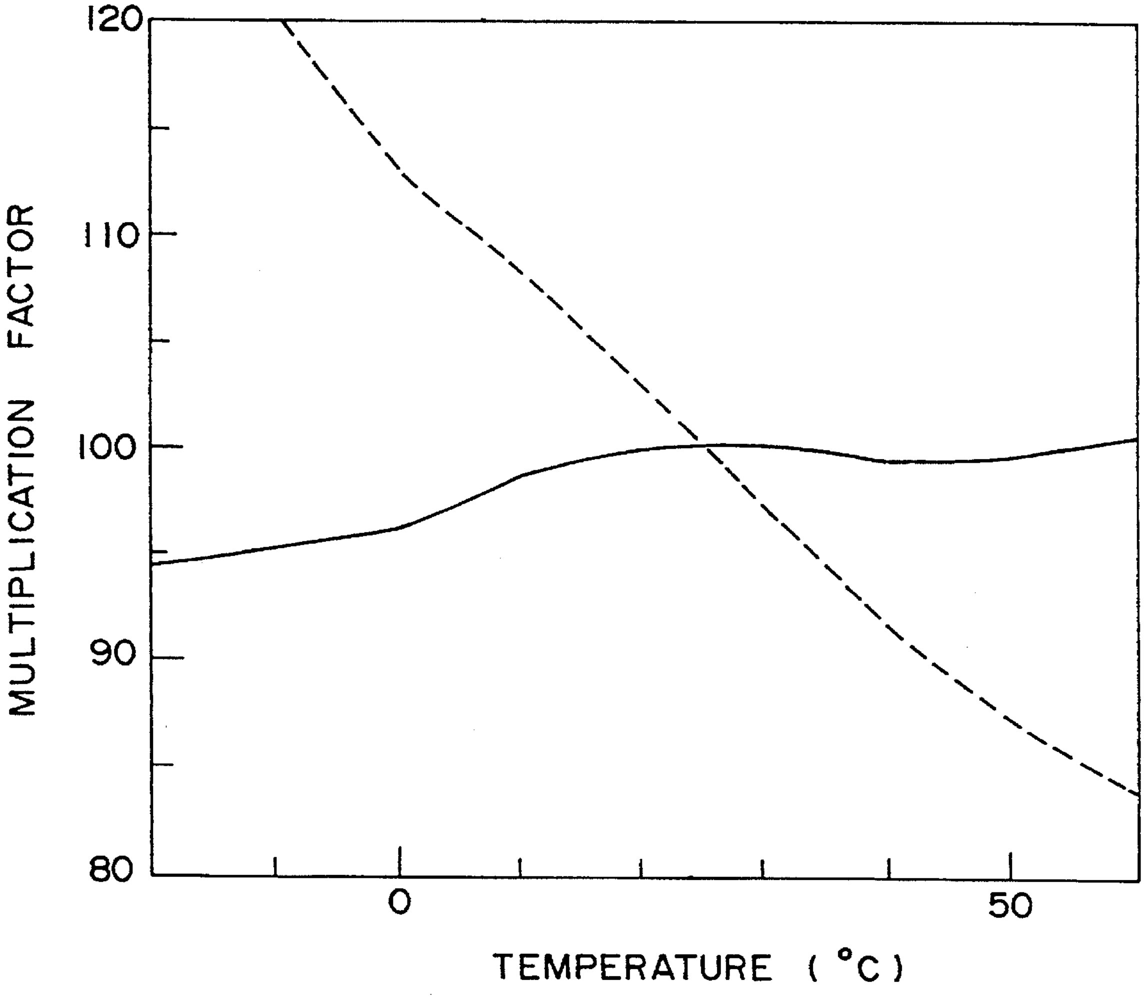
FIG. 7 is a graph showing temperature dependence of a multiplication factor M of a bias circuit of the present invention (solid line) and a conventional bias circuit (dotted line) (the multiplication factor is 100 at room temperature).

FIG. 7 is a graph showing experimental results which were conducted by adjusting the bias voltage of the APD2 for detecting a signal and setting the multiplication factor M of the second diode APD2 for detecting a signal to 100 at 25° C.

Figure 8:
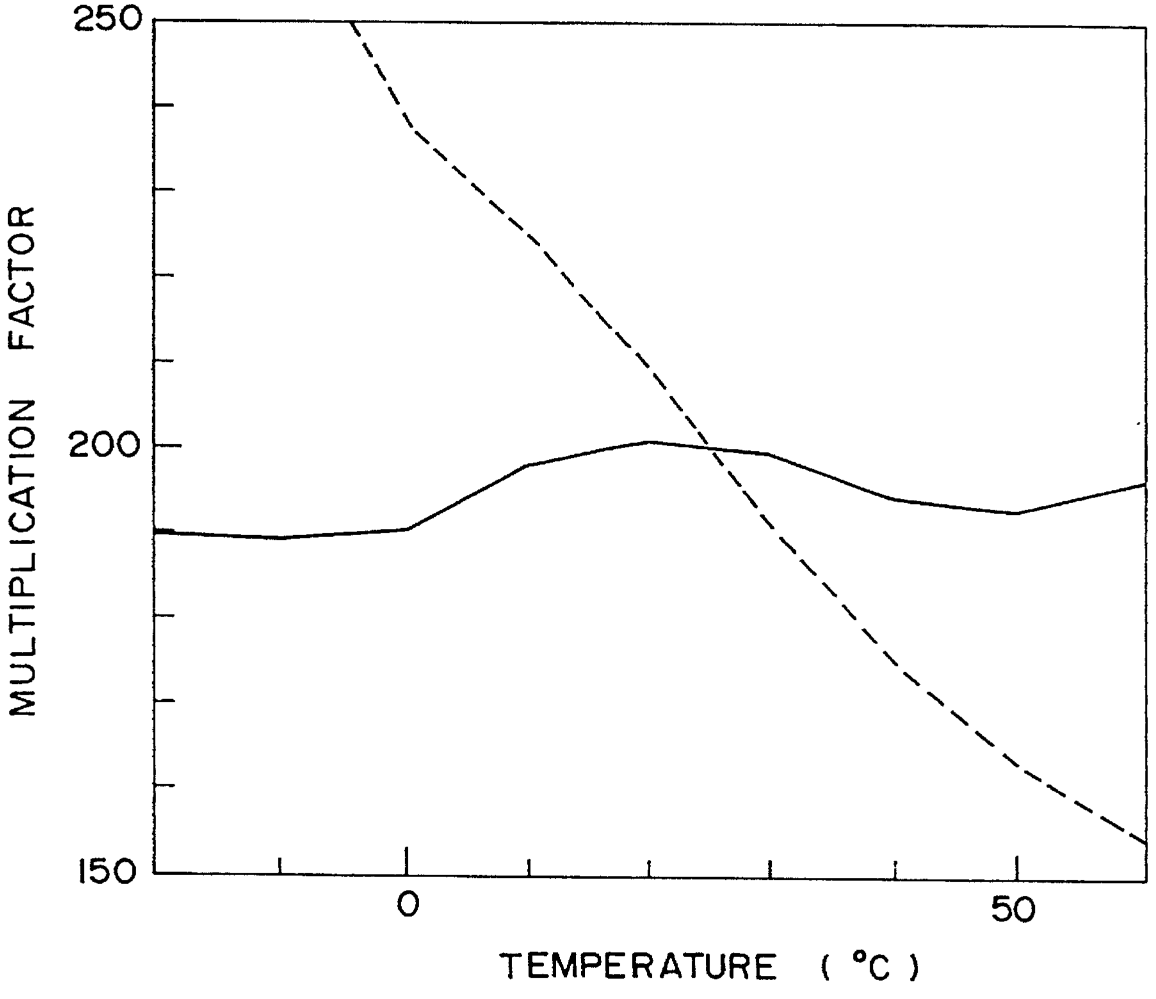
FIG. 8 is a graph showing temperature dependence of a multiplication factor M of a bias circuit of the present invention (solid line) and a conventional bias circuit (dotted line) (the multiplication factor is 200 at room temperature).

FIG. 8 is a graph showing experimental results which were conducted by adjusting the bias voltage of the APD2 for detecting a signal and setting the multiplication factor M of the second diode APD2 for detecting a signal to 200 at 25° C.

As apparent from these results, the bias circuit of the present invention can suppress the changes of the multiplication factor M of the second diode APD2 to very low and improve its temperature characteristic. In other words, the bias circuit, which performs the temperature compensation of the multiplication factor by fixing the voltage difference between the breakdown voltage of the first diode APD1 and the bias voltage of the second diode APD2 to be constant, is superior to the bias circuit, which performs the temperature compensation by fixing the ratio of the breakdown voltage of the first diode APD1 and the bias voltage of the second diode APD2, in the temperature compensation of the multiplication factor.

Figure 9:
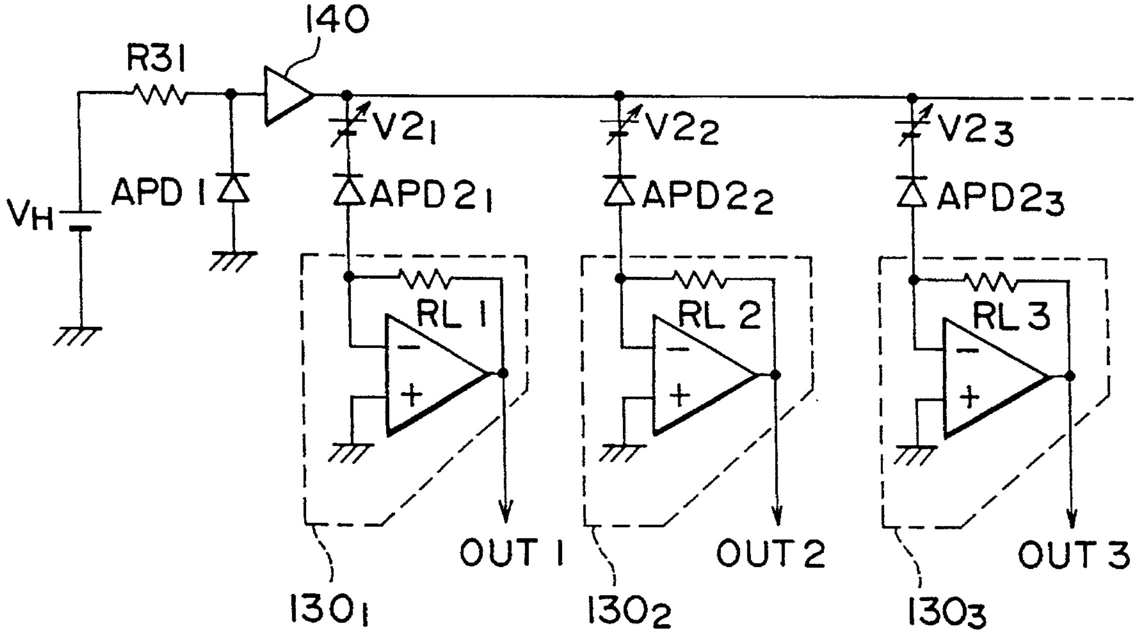
FIG. 9 is a circuit diagram showing one example of bias circuit structure in which a plurality of APDs operate at the same multiplication factor with high stability.

FIG. 9 shows a bias circuit in which a plurality of APDs operate with high stability and the same multiplication factor. A cathode of a first diode (APD for temperature compensation) APD1 is connected to an anode of a power supply $V_H$. A resistor R31 is connected between the cathode of the first diode APD1 and the anode of the power supply $V_H$. An anode of the first diode APD1 is grounded. A cathode of the first diode APD1 is connected to anodes of a plurality of equivalent power supplies $V2_1$, $V2_2$, $V2_3$ . . . through a buffer amplifier 140. Cathodes of a plurality of second diodes (APDs for detecting light) $APD2_1$, $APD2_2$, $APD2_3$, and $APD2_4$ are connected to cathodes of the power supplies $V2_1$, $V2_2$, $V2_3$ . . . , respectively. An input of a circuit (transimpedance amplifier) $\mathbf{130}_1$, $\mathbf{130}_2$ and $\mathbf{130}_3$ for converting current to voltage is connected to each anode of the second diode. Optical signals detected by the second diodes APD2 are outputted from outputs OUT1, 2, 3 . . . of the circuits $\mathbf{130}_1$, $\mathbf{130}_2$, $\mathbf{130}_3$ . . . , respectively.

In this circuit, the diode APD1 is made to operate in breakdown region by the power supply $V_H$ and the resistor R31, and its cathode voltage is amplified by the buffer amplifier 140 the gain of which is 1 and applied to the $APD2_1$, $APD2_2$, $APD2_3$ . . . .

The voltage applied to each $APD2_1$, $APD2_2$, $APD2_2$, and $APD2_4$ is adjusted individually by the equivalent constant voltage sources $V2_1$, $V2_2$, $V2_3$ . . . (in the same way as FIG. 3, constituted by a high voltage source, and a resistor) because the bias voltage of each APD for a constant multiplication factor is different from each other. The anodes of the $APD2_1$, $APD2_2$ and $APD2_3$ are connected to the inverting inputs of the operational amplifiers in the circuits $\mathbf{130}_1$, $\mathbf{130}_2$, $\mathbf{130}_3$ . . . , respectively. The output current of each APD appears at the output of the circuit as the voltage expressed by the product of the output current of the APD and the resistor $R_1$, $R_2$, $R_3$ . . . . As described above, in this circuit, the change of the multiplication factor caused by the change of temperature is also suppressed, and the sensitivity is adjusted only by setting the multiplication factor with $V2_1$, $V2_2$, $V2_3$ . . . .

Figure 10:
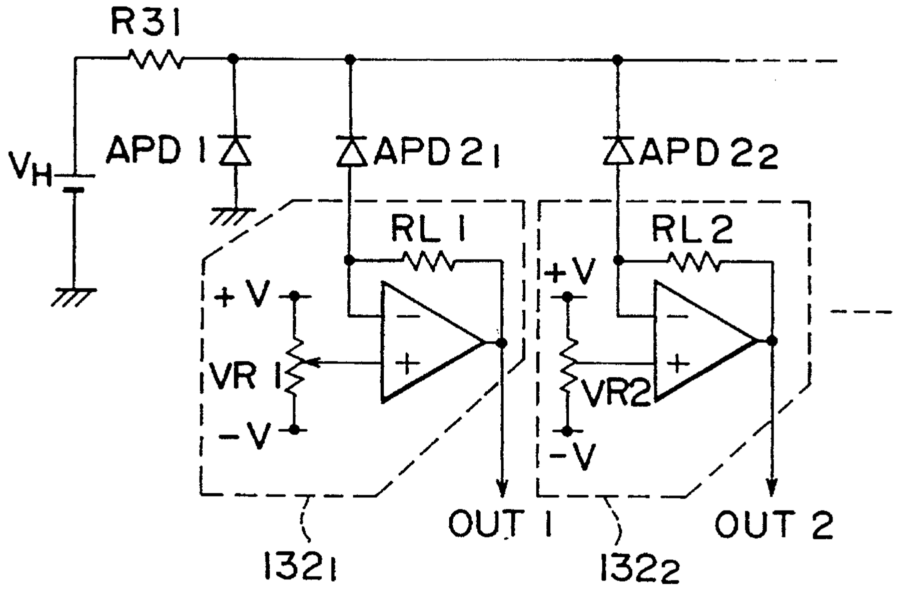
FIG. 10 is a circuit diagram showing one example of bias circuit structure in which a plurality of APDs operate at the same multiplication factor with high stability.

FIG. 10 shows a bias circuit which can adjust the bias voltage to be applied to a plurality of the second diodes $APD2_1$, $APD2_2$, $APD2_3$ . . . in the same way as the one shown in FIG. 4. Amplifiers $\mathbf{132}_1$, $\mathbf{132}_2$, $\mathbf{132}_3$ . . . are connected to these second diodes $APD2_1$, $APD2_2$, and $APD2_3$ . . . , respectively. In this bias circuit, the APD1 is made to operate in breakdown by the power supply $V_H$ and the resistor R31, and the cathode voltage is directly applied to the cathodes of the $APD2_1$, $APD2_2$, and $APD2_3$.

On the other hand, the anodes of the second diodes $APD2_1$, $APD2_2$, $APD2_3$ . . . are connected to the inverting inputs of the operational amplifiers $\mathbf{132}_1$, $\mathbf{132}_2$, $\mathbf{132}_3$ . . . , respectively. The potential of the non-inverting inputs of the operational amplifiers $\mathbf{132}_1$, $\mathbf{132}_2$, $\mathbf{132}_3$ . . . can be adjusted by the variable resistors $V_1$, $V_2$, $V_3$ . . . . The potential of the inverting input and the non-inverting input of each operational amplifier $\mathbf{132}_1$, $\mathbf{132}_2$, $\mathbf{132}_3$. . . are operated to be qual, so that the voltage difference between the breakdown voltage of the first diode APD1 and the voltage set by each variable resistor (volume) $V_1$, $V_2$, $V_3$ . . . is applied to the second diode APD2 as a bias voltage.

Since the cathodes of the plurality of the second diodes $APD2_1$, $APD2_2$, $APD2_3$ . . . and the cathode of the first diode APD1 are connected to the same node, this bias circuit can easily be formed on the same silicon substrate. Further, the voltage applied to each second diode $APD2_1$, $APD2_2$, $APD2_3$ . . . is needed to be adjusted individually since the bias voltage for each second diode $APD2_1$, $APD2_2$, $APD2_3$ . . . to generate the constant multiplication factor is different.

The temperature coefficient of each second diode $APD2_1$, $APD2_2$, $APD2_3$ . . . is substantially constant, so that the bias voltage $Vm_2$ can be set the constant voltage lower than the breakdown voltage of the first diode APD1 only by adjusting the variable resistors VR1 and VR2 connected to the non-inverting input of each operational amplifier $\mathbf{132}_1$ and $\mathbf{132}_2$. Consequently, the stability of the bias circuit is drastically improved and the plurality of APDs are easily operated.

Thus, the bias circuit of the present invention can operate with high stability by setting only the multiplication factor, and the adjustment of every temperature coefficient is not required. Further, in the case of the bias circuit operating at the constant voltage difference between the bias voltage and the breakdown voltage, the stability of the bias circuit is superior in a high multiplication factor (>100) region, and the bias circuit can easily be used in the multiplication factor of 300–500. Furthermore, in a multi-configuration, a process of adjusting a product can drastically be reduced and the change of the multiplication factor of each pixel is suppressed, and the APD can easily be utilized in a very feeble light region.

As described above, according to the present invention, the difference between the bias voltage and the breakdown voltage is kept at constant. Consequently, in the case that the difference between the voltage at which the avalanche photodiode shows a high multiplication factor and the breakdown voltage is constant, the bias circuit can operate at high multiplication factor although the temperature varies. Therefore, photodetection can be performed by simple circuit, high sensitivity and high stability against the change of temperature, using avalanche photodiodes.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

The basic Japanese Application No. 170289 filed on Jul. 9, 1993 is hereby incorporated by reference.

What is claimed is:

1. A photodetecting circuit comprising:

(a) a first avalanche photodiode for detecting light, said first avalanche photodiode having a first breakdown voltage and a first cathode;

(b) a second avalanche photodiode having a second breakdown voltage and a second cathode, said second breakdown voltage being within 100±20% of said first breakdown voltage; and (c) a constant voltage circuit connecting said first cathode and said second cathode, wherein a potential of said second cathode is higher than a potential of said first cathode, and wherein a difference in potential between said first cathode and said second cathode is maintained constant by said constant voltage circuit.

2. A photodetecting circuit according to claim 1, wherein said second avalanche photodiode has an anode, said photodetecting circuit further comprising a power supply connected to said second avalanche photodiode for applying a voltage between said anode and said second cathode to make said second avalanche photodiode breakdown.

3. A photodetecting circuit according to claim 1, wherein said constant voltage circuit comprises a Zener diode having an anode and a cathode, said cathode of said Zener diode being connected to said second cathode, and said anode of said Zener diode being connected to said first cathode of the first avalanche photodiode.

4. A photodetecting circuit according to claim 1, further comprising:

a transistor having an emitter, a base and a collector, said emitter being connected to ground, said collector being connected to an anode of said first avalanche photodiode; and an operational amplifier having two input terminals and an output terminal, said output terminal being connected to said base of said transistor, one of said input terminals being connected to said output terminal via a condenser and to ground via a variable resistor, and the other of said input terminals being connected to said collector via a first resistor and to ground via a second resistor.

5. A bias circuit for applying a bias voltage to a first avalanche photodiode having a first cathode, said first avalanche photodiode detecting light and having a first breakdown voltage, said bias circuit comprising:

(a) a second avalanche photodiode having a second cathode, said second avalanche photodiode having a second breakdown voltage that is within 100±20% of said first breakdown voltage; and (b) a constant voltage circuit connecting said first and second cathodes, wherein a potential of said second cathode is higher than a potential of said first cathode, and wherein a difference in potential between said first cathode and said second cathode is maintained constant by said constant voltage circuit.

6. A bias circuit according to claim 5, wherein said second avalanche photodiode has an anode, said bias circuit further comprising a power supply connected to said second avalanche photodiode for applying a voltage between said anode and said second cathode to make said second avalanche photodiode breakdown.

7. A bias circuit according to claim 5, wherein said constant voltage circuit comprises a Zener diode having an anode and a cathode, said cathode of said Zener diode being connected to said second cathode, said anode of said Zener diode being connected to said first cathode of the first avalanche photodiode.

8. A bias circuit according to claim 5, further comprising:

a transistor having an emitter, a base and a collector, said emitter being connected to ground, said collector being connected to an anode of said first avalanche photodiode; and an operational amplifier having two input terminals and an output terminal, said output terminal being connected to said base of said transistor, and one of said input terminals being connected to said output terminal via a condenser and to ground via a variable resistor, and the other of said input terminals being connected to said collector via a first resistor and to ground via a second resistor.

9. A bias circuit for applying a bias voltage to a plurality of avalanche photodiodes for detecting light, said avalanche photodiodes each having a breakdown voltage corresponding thereto, comprising:

(a) a first avalanche photodiode having an anode and a cathode, a breakdown voltage of said first avalanche photodiode being within 100±20% of the respective breakdown voltages of said plurality of avalanche photodiodes; and (b) a plurality of constant voltage circuits, each connecting a cathode of one of said plurality of avalanche photodiodes to said cathode of said first avalanche photodiode, a potential at said cathode of said first avalanche photodiode being higher than a potential at any of said cathodes of said plurality of avalanche photodiodes, potential differences between said cathode of said first avalanche photodiode and said cathodes of each of said plurality of avalanche photodiodes each being maintained constant by said plurality of constant voltage circuits, respectively.

10. A bias circuit according to claim 9, wherein said first avalanche photodiode has an anode, said bias circuit further comprising a power supply connected to said first avalanche photodiode for applying a voltage between said anode and said cathode of said first avalanche photodiode to make said first avalanche photodiode breakdown.

11. A bias circuit for applying a bias voltage to a first avalanche photodiode for detecting light, said first avalanche photodiode having a first anode and a first breakdown voltage, said bias circuit comprising:

(a) a second avalanche photodiode having a second anode, said second avalanche photodiode having a second breakdown voltage within 100±20% of said first breakdown voltage; and (b) a constant voltage circuit connecting said first and said second anodes, wherein a potential at said second anode of said second avalanche photodiode is lower than a potential at said first anode of said first avalanche photodiode, a potential difference between said first anode and said second anode being maintained constant by said constant voltage circuit.

12. A bias circuit according to claim 11, wherein said second avalanche photodiode has a cathode, said bias circuit further comprising a power supply connected to said second avalanche photodiode for applying a voltage between said second anode and said cathode of said second avalanche photodiode to make said second avalanche photodiode breakdown.

* * * * *